United States Patent [19]
Halgrimson et al.

[11] Patent Number: 5,524,424
[45] Date of Patent: Jun. 11, 1996

[54] ELECTRONIC AREA COUNTER FOR A COMBINE

[75] Inventors: Curtis A. Halgrimson, Valley City, N. Dak.; Dale W. Panoushek, Orion, Ill.

[73] Assignee: Case Corporation, Racine, Wis.

[21] Appl. No.: 354,651

[22] Filed: Dec. 13, 1994

[51] Int. Cl.$^6$ .................................................. A01D 44/12
[52] U.S. Cl. ................................. 56/10.2 D; 56/10.2 A; 364/424.02
[58] Field of Search ........................ 56/10.2 D, 10.2 A, 56/10.2 E, 10.2 F; 364/513, 424.02; 180/167, 168, 169

[56] References Cited

U.S. PATENT DOCUMENTS 4,994,970  2/1991  Noji et al. ..................... 56/10.2 A X

*Primary Examiner*—Terry Lee Melius
*Attorney, Agent, or Firm*—Foley & Lardner

[57] ABSTRACT

An agricultural vehicle, tractor, or combine including an area counter for calculating the area upon which the vehicle has operated is disclosed herein. For example, the area counter may be utilized with a combine to determine the total acreage of crops which have been harvested by the combine. The area counter calculates a total area signal in accordance with a position signal indicative of the position of the header attached to the combine, a ground speed sensor, and a feeder speed signal. The position of the header (e.g., implement, harvester, or other farm equipment) is provided by a position sensor which provides indicia of the height of the header from a minimum level to a maximum level. The area counter compares the position signal to a threshold to determine whether the header is engaged or operating upon the crop. The area counter is programmed in a microprocessor and generates area data representative of the amount of area upon which the vehicle has operated during 0.5 second intervals. The area signals are accumulated as a total area signal.

20 Claims, 13 Drawing Sheets

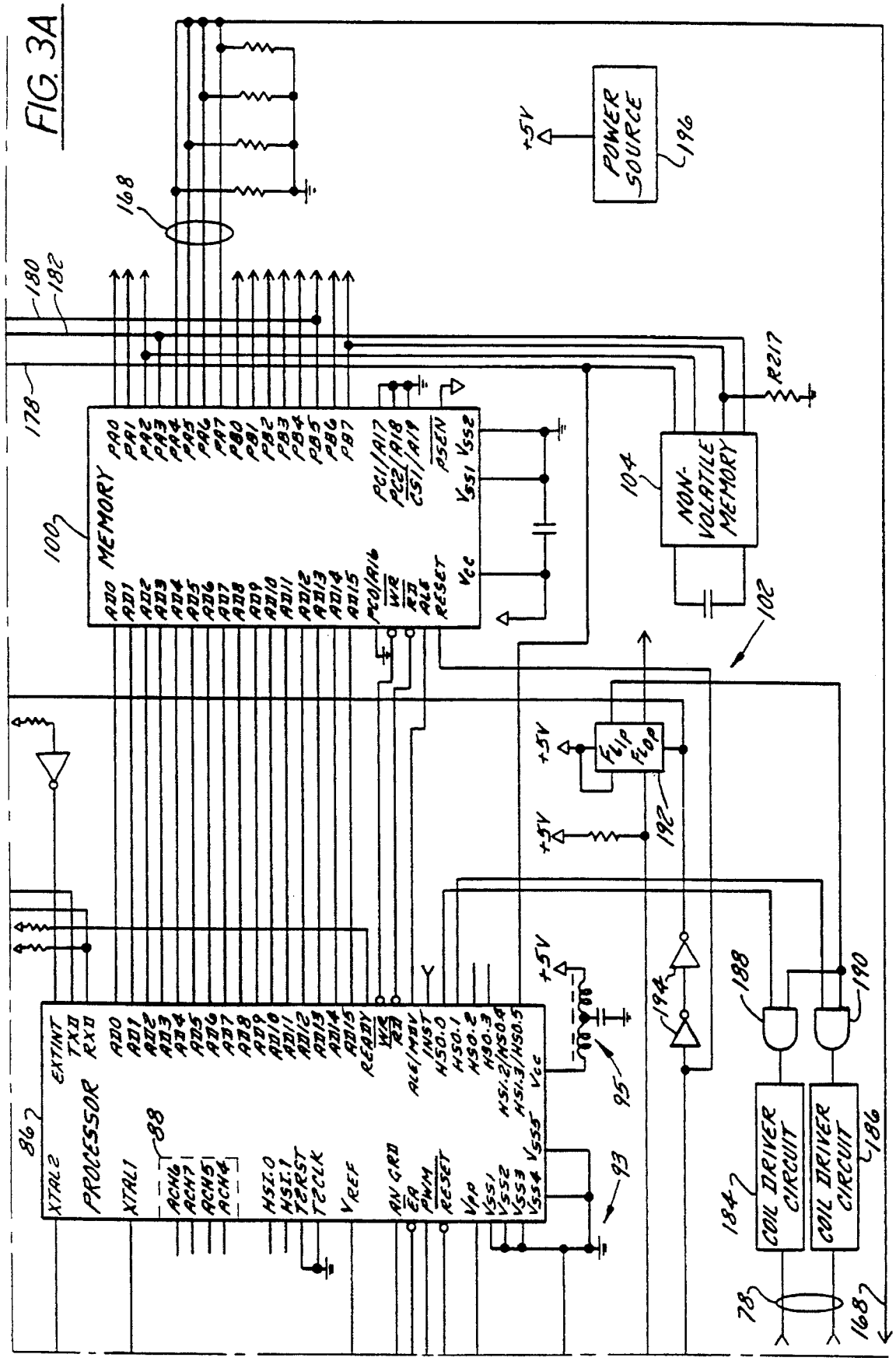

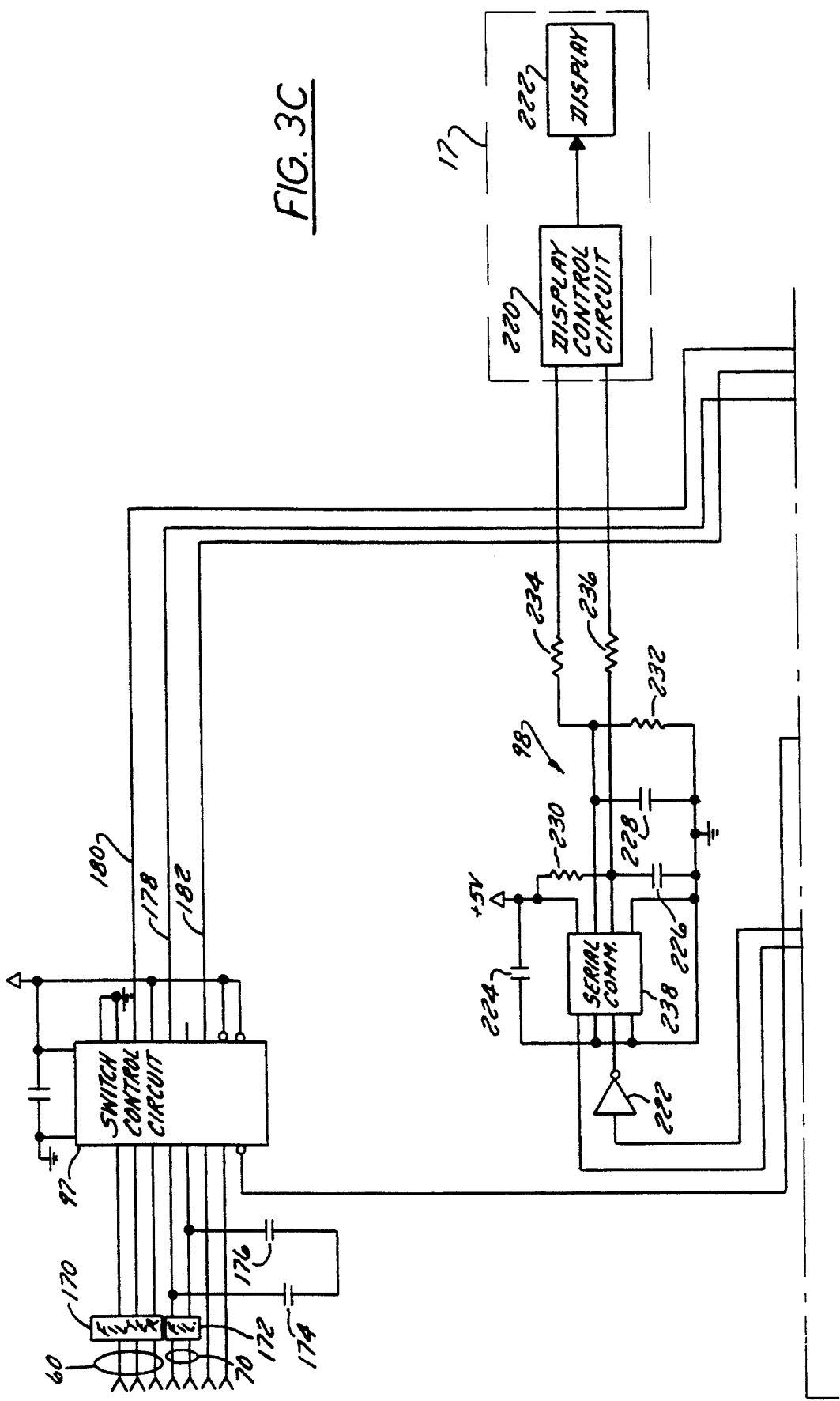

ELECTRONIC AREA COUNTER FOR A COMBINE

FIELD OF THE INVENTION

The present invention relates to a combine or agricultural vehicle. More particularly, the present invention relates to a control system which monitors the area harvested by the vehicle.

BACKGROUND OF THE INVENTION

Agricultural equipment such as a combine utilizes a head or other implement to perform various operations on a field. For example, combines may utilize an implement such as a harvester or header attached to a feeder to harvest a crop or other plant related matter. Generally, combines have hydraulic and/or electronic positioners which position the header and/or feeder based on the distance of the header from the surface upon which the header is operating. The operator raises or lowers the header to a particular elevation so that the header harvests the crop (header is engaged). The header remains engaged and harvests the crop along a path in the field until the combine must be turned around.

When the combine approaches the headlands of the field and is turned around, the header is raised to an elevation above the crop level (header is disengaged). Upon completion of the turn at the headlands and re-entry into the crop, the header is re-engaged and returned to its previous elevation for harvesting. Generally, it is useful to provide the operator indicia of the total area which has been harvested (total area over which the feeder has been engaged and the header has harvested a crop).

Heretofore, combines have included a mechanical or an analog area counters. These prior art area counters utilized a two-state contact switch (limit switch) to determine whether the feeder is in an engaged or disengaged position. The operator of the combine manually sets the vertical location of the switch so that it appropriately indicated the engaged or disengaged position. However, to vary the position of the switches, the operator was required to leave the interior of the combine and manually adjust or reset the vertical location of the switch when crops (e.g., wheat or corn) having different heights were harvested. These prior art area counters are also disadvantageous because the counters must be manually adjusted for different types of implements such as headers having different widths.

Accordingly, there is a need for a harvested area monitoring system which monitors the full range of implement positions and includes user interface which permits a user to adjust crop level setpoints and header widths from the interior of the combine.

SUMMARY OF THE INVENTION

The present invention relates to an area counter for use with farm equipment. The farm equipment cooperates with an implement to operate on an area of a field. The implement is capable of being positioned between a first level and a second level. The area counter includes an implement position sensor and a control circuit. The control circuit communicates with the implement position sensor and receives an implement position signal indicative of a position of the implement between the first level and the second level. The control circuit accumulates an area signal to provide a total area signal indicative of the area upon which the farm equipment and implement have been operated on when the implement position signal is in a predetermined relationship with a threshold.

The present invention also relates to agricultural machinery for use in a field. The machinery includes a position sensor for sensing a position of the machinery, a display providing visual indicia of an area of the field worked by the machine in response to an area signal, and a control circuit. The control circuit is coupled to the position sensor and receives a position signal related to the position of the machinery. The control signal provides the area signal in accordance with the position signal being in a predetermined relationship with a threshold.

The present invention also relates to a combine for harvesting a crop grown on an area of a field. The combine has a header proximate a header position sensor. The improvement includes an area counter communicating with the header position sensor. The area counter displays a total area value indicative of the area. The area counter accumulates area interval values to compute the total area value when the header position sensor indicates that the header is positioned below a particular level.

In one aspect of the present invention, the area counter provides a digital display of the area within the interior of the combine. In another aspect of the present invention, the threshold level at which the area counter accumulates the area is adjustable from within the interior of the combine. In a further aspect of the present invention, the area counter is implemented as a software subroutine within a control algorithm for performing and controlling the various functions for the combine.

The present invention advantageously monitors various inputs to determine when to accumulate area so that the most accurate reflection of the actual area of harvested field is provided. More particularly, the area counter accumulates area when header width is greater than zero, the feeder shaft speed is running, the combine is traveling, and the header position is below a user set point. Control instrumentation within the combine allows a user to change the user set point or enter a different header width. Preferably, a position sensor provides a position signal indicative of the height of the header across a range on a serial communication link. Additionally, the area counter provides indicia of when the header is below the threshold.

DETAILED DESCRIPTION OF THE PREFERRED EMBODIMENT

Figure 1:
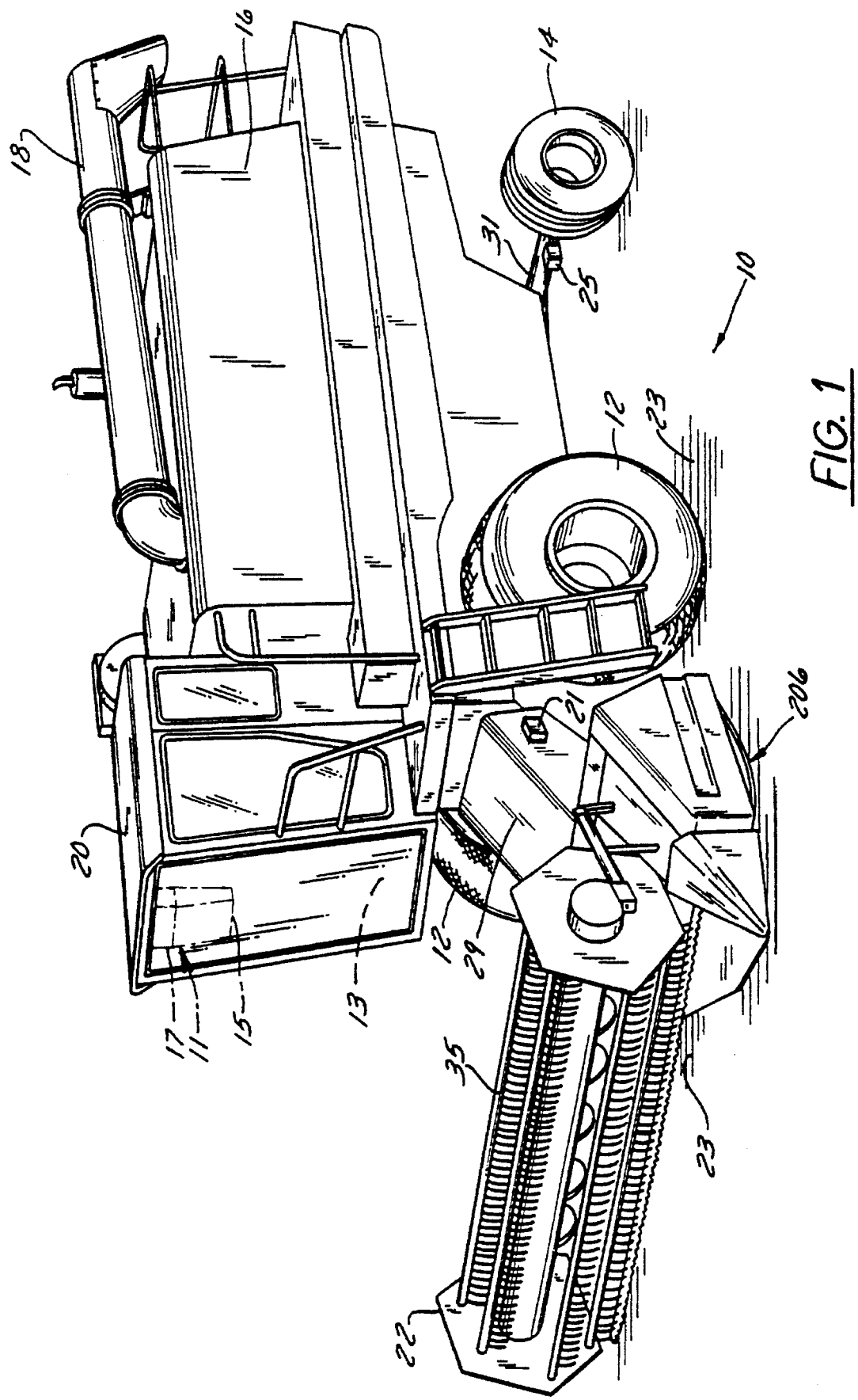
FIG. 1 illustrates an agricultural vehicle including a moveable harvesting implement and an area counter.

Referring to FIG. 1, an agricultural vehicle 10 includes a pair of drive wheels 12 located at the front end of vehicle 10, a pair of steerable wheels 14 located at the rear end of vehicle 10, a machinery and grain storage compartment 16, a grain elevator and chute 18, an operator cab 20, and a support frame (structure) for joining and supporting the above-listed components. (By way of example only, vehicle 10 may be a combine of the type manufactured by Case Corporation having Model No. 1660.)

Attached to a feeder 29 at the front end of the frame of vehicle 10 (i.e. the front-most end of vehicle 10 along its forward direction of travel during harvesting) is a header 22 such as a grain harvesting header. (By way of example, header 22 could be a Combine Corn Head Series 1000 sold by Case Corporation.) Header 22 is positioned relative to vehicle 10 and/or the surface 23 upon which vehicle 10 is moving (i.e. the ground from which the respective plant related matter, grain or vegetation, is being harvested). Header 22 includes a reel 35 for cutting or harvesting the crop. The harvested crop is provided to feeder 21 which includes an auger or conveyer mechanism (not shown) for transporting the harvested crop to chute 18. To efficiently harvest the grain or vegetation, it is useful to provide control over the position or location of header 22.

Agricultural vehicle 10 includes control instrumentation 11 mounted in an interior 13 of cab 20. Instrumentation 11 includes an area counter 15 which provides a numeric indication on a display 17 of the area upon which header 22 has operated while being positioned at a selected location or within a range of selected locations. Area counter 15 is discussed in more detail below with reference to FIGS. 5 and 6.

Area counter 15 receives signals from a position sensor 34 (shown in FIG. 2), a feeder shaft speed sensor 21, and a ground speed sensor 25, and utilizes these signals to accumulate the area. Ground speed sensor 25 is preferably mounted on an axle 31 proximate a non-driving wheel such as wheel 14. Feeder shaft speed sensor 21 is preferably mounted proximate the conveyor or auger mechanism within feeder 29.

Figure 2:
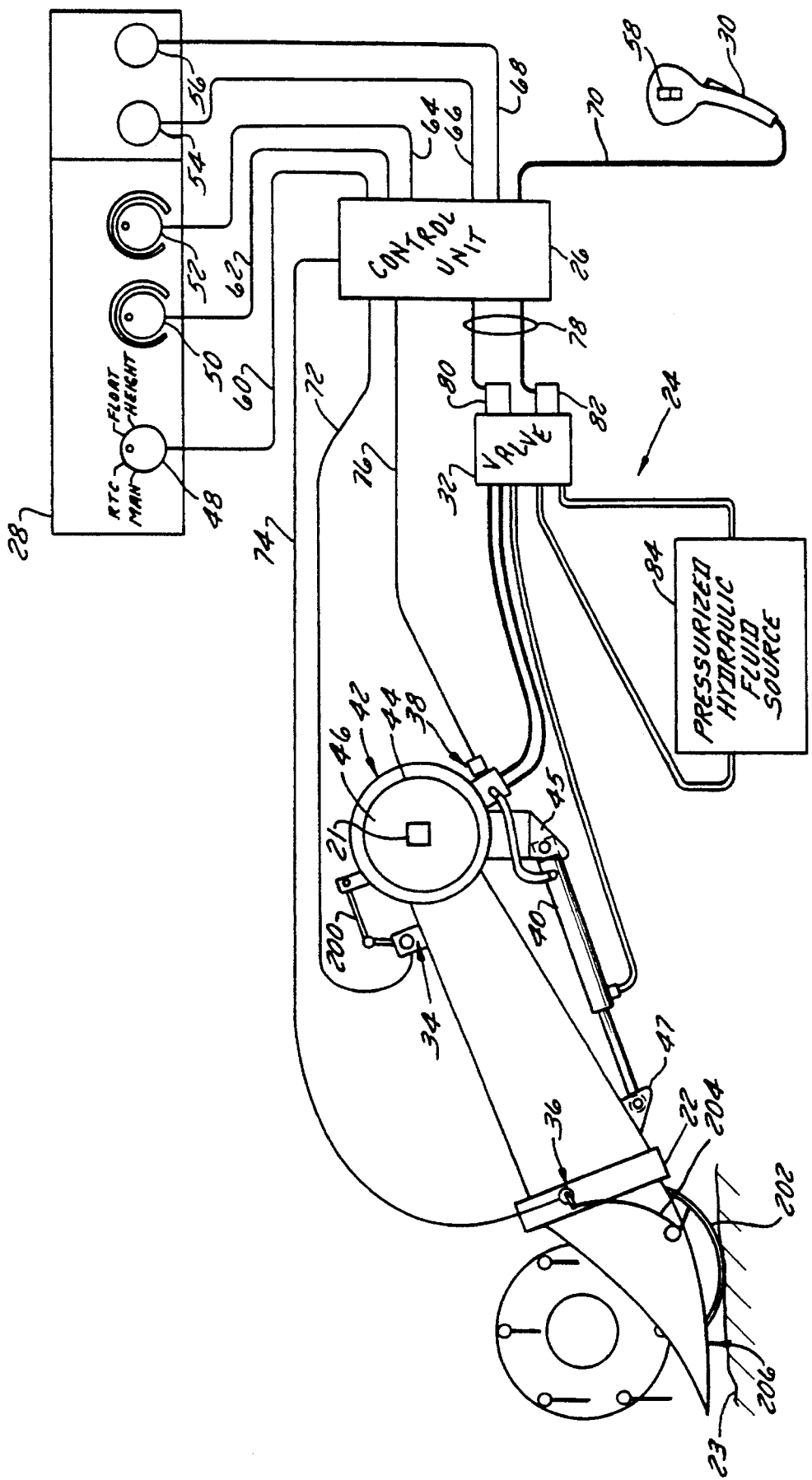
FIG. 2 is a schematic representation of the preferred embodiment of an implement position control system.

FIG. 2 is a schematic representation of the preferred embodiment of the implement position control system 24. Control system 24 includes a microprocessor based control unit (circuit) 26, a man-controller interface 28, a vehicle direction and speed control lever 30, a hydraulic control valve 32, a position sensor 34, a location transducer 36, a pressure transducer 38, and an implement positioner (lift mechanism) 40 (e.g. hydraulic lift cylinders, cable lift arrangements, hydraulic motor and gear arrangements, or electric motor and gear arrangements). In the present embodiment, mechanism 40 includes hydraulic lift cylinders and position sensor 34 and transducer 36 are potentiometers. However, sensor 34 and transducer 36 could be replaced with LVDTs, and transducer 38 could be replaced by a current monitoring circuit if an electric motor were used in mechanism 40.

Header 22 is rotatably supported relative to vehicle 10 by a bearing assembly 42. Bearing assembly 42 includes a fixed bearing portion 44 and a movable bearing portion 46 fastened to header 22. Fixed bearing portion 44 is fastened to vehicle 10 and to attachment member 45, and control mechanism 40 is mounted between member 45 and a second attachment member 47 fixed to header 22. In this arrangement, system 24 is operable to control mechanism 40 which moves (rotates) header 22 relative to vehicle 10. By way of modification, header 22 can be movably supported relative to vehicle 10 using other mechanical arrangements such as, for example, a parallelogram linkage arrangement which supports header 22 and, during raising and lowering, guides header 22 along a path which is generally perpendicular to surface 23.

Referring more specifically to system 24, interface 28, preferably located on instrumentation 11, includes a mode switch 48, a reference position (location) signal generator 50, a reference pressure signal generator 52, a raise rate signal generator 54, and a lowering rate signal generator 56. In the present embodiment, generators 50, 52, 54 and 56 are potentiometers. However, generators 50, 52, 54 and 56 could be switches which are capable of producing digital signals representative of the associated positions, pressures and rates.

In addition to mode selector switch 48, system 24 also includes a raise and lower switch 58 which is mounted in lever 30. By way of example, raise and lower switch 58 is a centrally biased momentary contact switch. Switch 48 is coupled to unit 26 by a signal bus 60, generator 50 is coupled to unit 26 by a signal bus 62, generator 52 is coupled to unit 26 by a signal bus 64, generator 54 is coupled to unit 26 by a signal bus 66, generator 56 is coupled to unit 26 by a signal bus 68, and switch 58 is coupled to unit 26 by a signal bus 70.

Control unit 26 is also coupled to sensor 34 by a signal bus 72, transducer 36 by a signal bus 74, and transducer 38 by a signal bus 76. Control unit 26 is coupled to hydraulic control valve 32 by a signal bus 78. More specifically, control valve 32 includes a raise solenoid 80 and a lowering solenoid 82 to which signal bus 78 is connected. Control unit 26 applies pulse width modulated signals to solenoids 80 and 82 which allow valve 32 to control the flow of fluid between a pressurized hydraulic fluid source 84 and lift cylinders 40. In the present embodiment, source 84 is a hydraulic pump connected in series with a hydraulic fluid storage tank and appropriate filters.

Position sensor 34 may be a potentiometer, magnetic sensor, an array of limit switches, a sonic sensor, an optical sensor, or other device for providing a signal representative of the level or elevation of header 22. Sensor 34 is preferably mounted proximate header 22 so that an accurate measure of height from ground surface 23 can be determined.

Referring to FIG. 3 (3A, 3B, 3C) control unit 26 includes a digital processor 86 (microcontroller, e.g. Motorola 80C198 having an internal analog-to-digital converter 88, an analog-to-digital converter voltage reference source 90, a processor watchdog circuit 92, an analog signal filtering and isolation circuit 94, an analog multiplexer 96, a switch input control circuit 97, a serial communications interface 98, a memory and a programmed logic control and memory circuit 100 (e.g. psd-312 sold by Wafer Scale Integration or Phillips/Sygnetics), a pulse width signal generation circuit 102, and a non-volatile memory 104.

Voltage reference source 90 (FIG. 3B) includes resistors 106 and 108, capacitors 110, 112 and 114, and operational amplifier 116 coupled to the voltage reference and analog ground of processor 86 as shown. Source 90 operates to provide a voltage range for analog-to-digital converter 88 within which voltage signals are converted to digital values.

Processor watchdog circuit 92 (FIG. 3B) includes resistors 118, 120, 122, 123 and 124, capacitors 126, 128 and 130, diode 132, low voltage detector 134, inverter 136, and transistor 138 coupled to the reset of processor 86 as shown. Circuit 92 resets processor 86 when the power source 196 voltage falls below a predetermined level.

Analog multiplexer 96 (FIG. 3B) includes at least seven analog inputs which are selectively coupled to an analog output 166, which is in turn coupled to the input of isolation circuit 94. Signal buses 62, 64, 66, 68, 72, 74 and 76 are coupled to the analog inputs of multiplexer 96 by appropriate filtering circuits 152, 154, 156, 158, 160, 162 and 164, respectively. The analog inputs of multiplexer circuit 96 are selectively switched between the output 166 via a 4-bit data bus 168 which is coupled to the output of control circuit 100. Accordingly, processor 86 selectively controls the application of the signals from transducers 34, 36 and 38 and signal generators 50, 52, 54 and 56 to analog-to-digital converter 88 by applying the appropriate address signals to control circuit 100, which in turn applies the appropriate 4-bit signal to data bus 168 for selectively applying the desired analog signal to analog output 166.

Analog signal isolation circuit 94 (FIG. 3B) is coupled between output 166 of multiplexer 96 and one analog input of analog-to-digital converter 88 to provide filtering and isolation there between. Circuit 94 includes capacitors 140 and 142, operational amplifier 144, zener diode 146, diode 148 and resistor 150 coupled between output 166 and the analog input channel of analog-to-digital converter 88 as shown.

As an alternate to the use of multiplexer 96, multiplexer 96 could be eliminated by using an analog-to-digital converter 88 with a sufficient number of analog input channels to handle the analog input signals from transducers 34, 36 and 38 and signal generators 50, 52, 54 and 56. However, such an arrangement increases the amount of circuitry required for filtering and isolation since an isolation circuit 94 may be required for all of the analog input channels to analog-to-digital converter 88. Thus, where sufficient sampling speed is obtained by using multiplexer 96 and a signal analog channel input to analog-to-digital converter 88, circuitry can be conserved since only one isolation circuit 94 is necessary.

The statuses of switch 48 and switch 58 are monitored by processor 86 via switch input control circuit 97, coupled between switch 48 and circuit 97, and control circuit 100. More specifically, signal bus 60 includes three conductors which are coupled to circuit 97 via an appropriate filtering circuit 170. Mode selector switch 48 includes three contacts each connected to one of the three signal conductors of bus 60, and selectively connected to a reference voltage (e.g. 12 volts) upon the status (position) of mode selector switch 48. When a signal is not present on bus 60, switch 48 is assumed to be in the manual position. Signal bus 70 includes two conductors connected to contacts in raise and lower switch 58 which are selectively connected to the reference voltage, depending upon the status of switch 58 (e.g., when switch 58 is in the uppermost position, one conductor is connected to the reference voltage and when switch 58 is in the lowermost position, the other conductor is connected to the reference voltage). Signal bus 70 is coupled to control circuit 97 by a filtering circuit 172. In addition to filtering circuit 172, further filtering is provided by capacitors 174 and 176 coupled between the conductors of bus 70 and ground.

Processor 86, circuit 97 and circuit 100 cooperate to sequentially sample each of the conductors of signal buses 60 and 70. More specifically, circuit 97 operates as a storage and shift register to sample the statuses of the six signal conductors in signal buses 60 and 70. Subsequently circuit 97 shifts through the memory location associated with each conductor, and sequentially applies a logic level representative of the status of each conductor to output data line 178 in response to an input signal at input control line 180 and a clocking signal at clock conductor 182. By way of example, when control line 180 is HIGH, the register is cleared, and when control line 180 is LOW the statuses of the six signal conductors are stored in the register and the register is shifted left (or right depending upon the biasing of circuit 97) in response to each clock pulse on line 182. Circuit 97 is coupled to processor 86 to sequentially apply the logic levels representative of the statuses of the signal conductors of signal buses 60 and 70 to processor 86 via data line 178.

Pulse-width generation circuit 102 (FIG. 3A) includes a solenoid coil driver circuit 184 (raising), a solenoid coil driver circuit 186 (lowering), an AND gate 188, an AND gate 190, a flip flop 192, and a pair of inverters 194 with hysteresis coupled together and to processor 86 as shown in FIG. 3. Driver circuit 184 and 186 are conventional circuits for producing sufficient power to energize the coils of the raise solenoid 80 and the lowering solenoid 82 of control valve 32, respectively, based upon the output signals from AND gates 188 and 190, respectively.

The output of flip flop 192 is coupled to a first input of AND gates 188 and 190. Flip flop 192 is connected to the PWM pin of processor 86 and applies a logic HIGH signal to AND gates 188 and 190 at a frequency determined by the output of processor 86 applied to flip flop 192 (e.g. 100 Hz) with a selectable pulse width. The second input to AND gate 188 is coupled to one digital output of processor 86 and the second input of AND gate 190 is coupled to another output of processor 86 to select one of circuits 184 or 186. The width of the 100 Hz signal applied to coil driver circuits 184 and 186 from gates 188 and 189, respectively, is varied to control the speed at which lift cylinders 40 are extended and contracted (i.e., the rate of fluid flow from fluid source 84 to lift cylinders 40 depends upon the width of the pulse, where zero width means no movement of cylinders 40 and maximum pulse width means movement of cylinders 40 at their maximum speed), respectively. As a result, the speed at which header 22 can be raised and lowered can be varied by varying the width of the pulse width modulated signal applied to solenoids 80 and 82 by coil driver circuits 184 and 186, respectively.

Figure 3B:
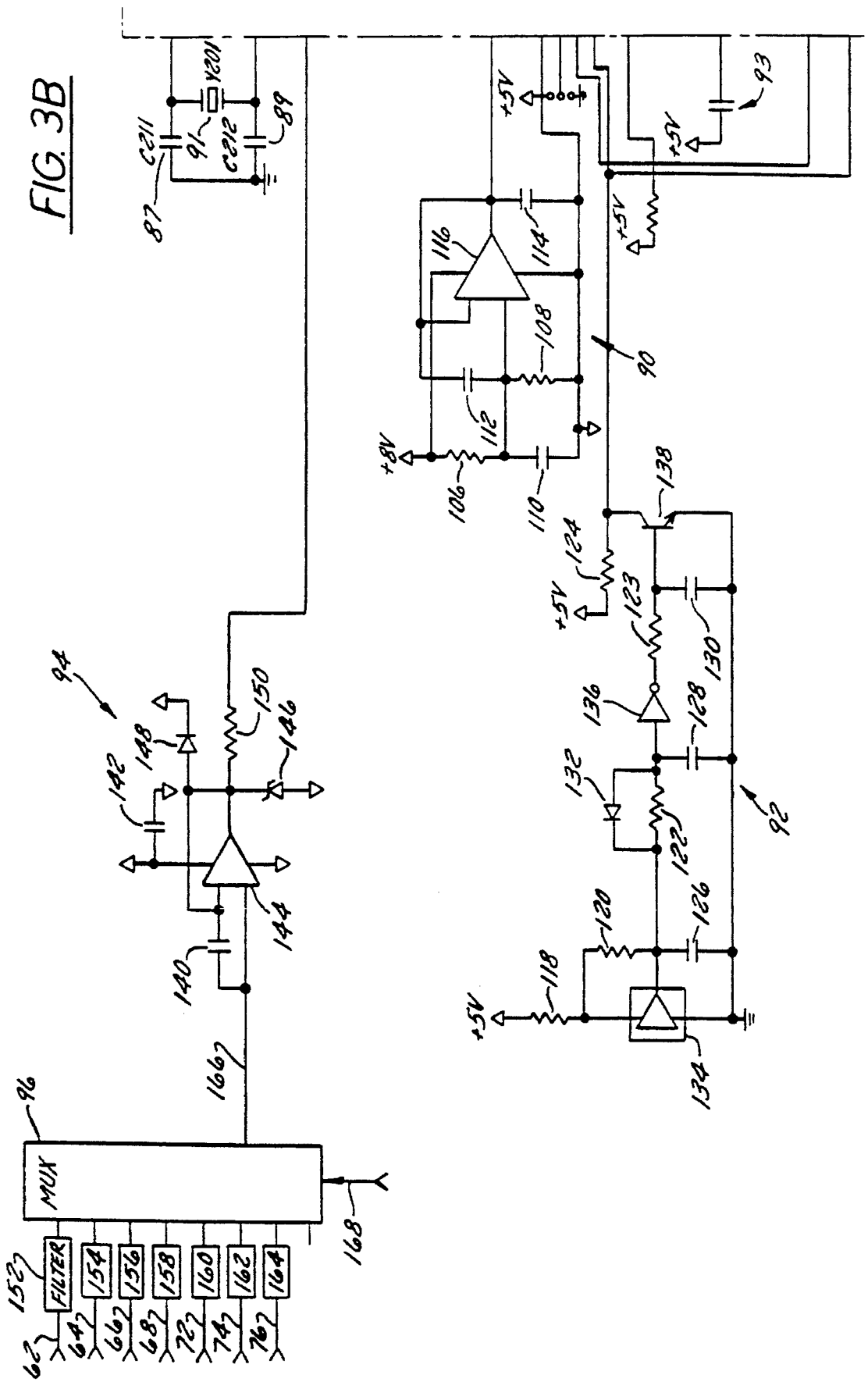
FIG. 3, including sheets 3A–3C, is a schematic diagram of the control system circuitry.
Figure 4A:
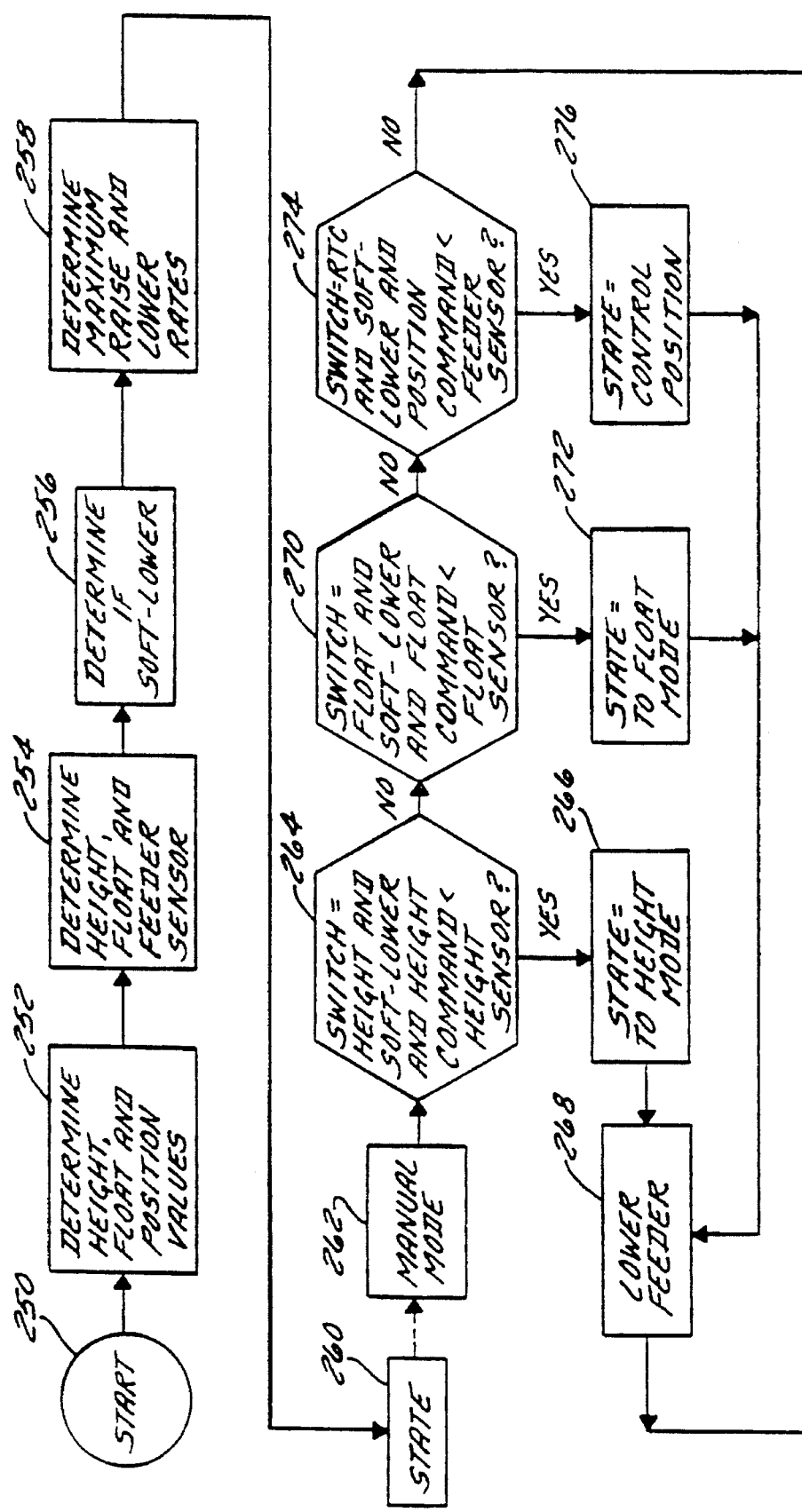
FIG. 4, including sheets 4A–4D, is a flow chart representative of the programming for the control system.
Figure 4B:
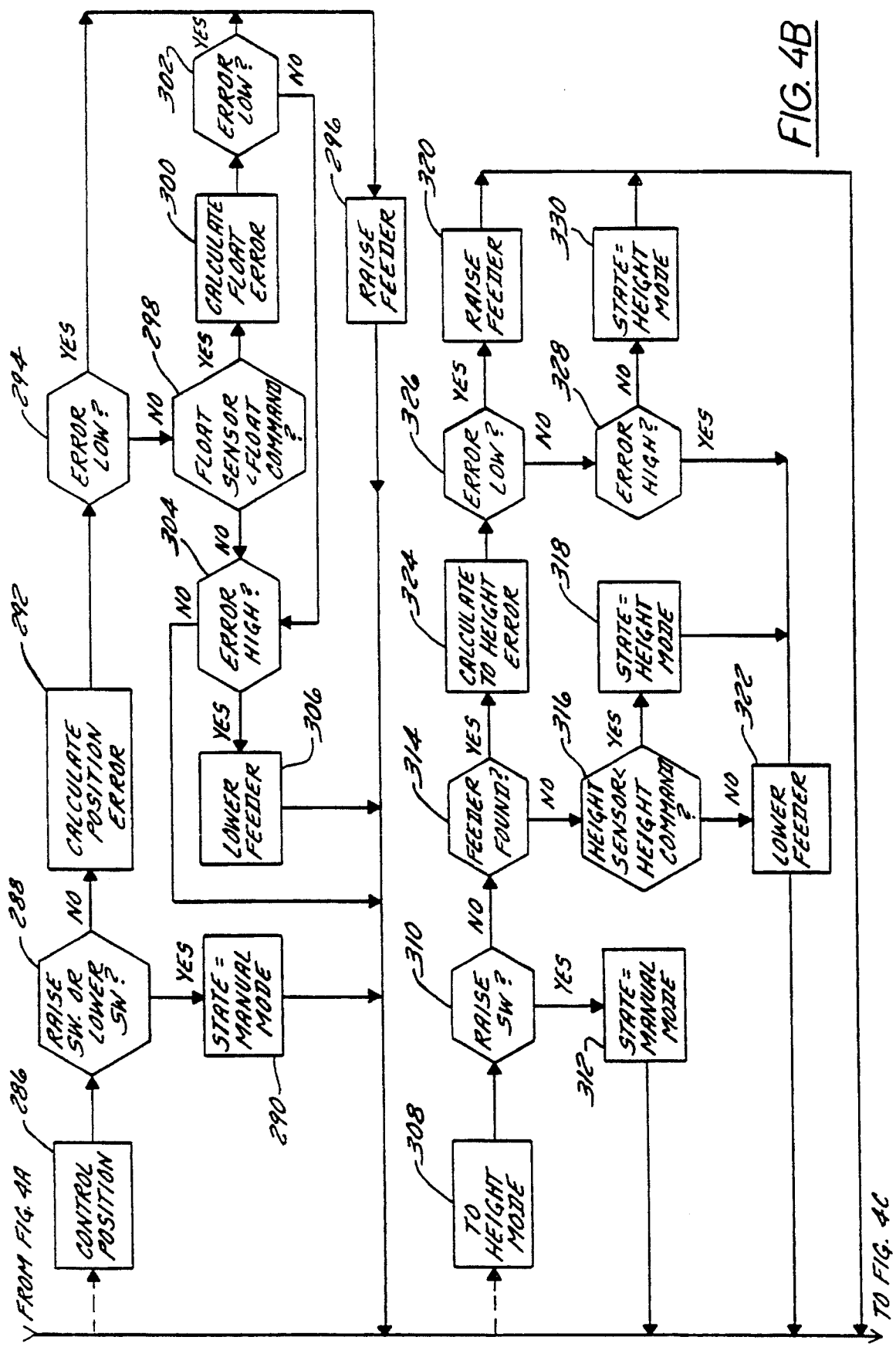
Figure 4C:
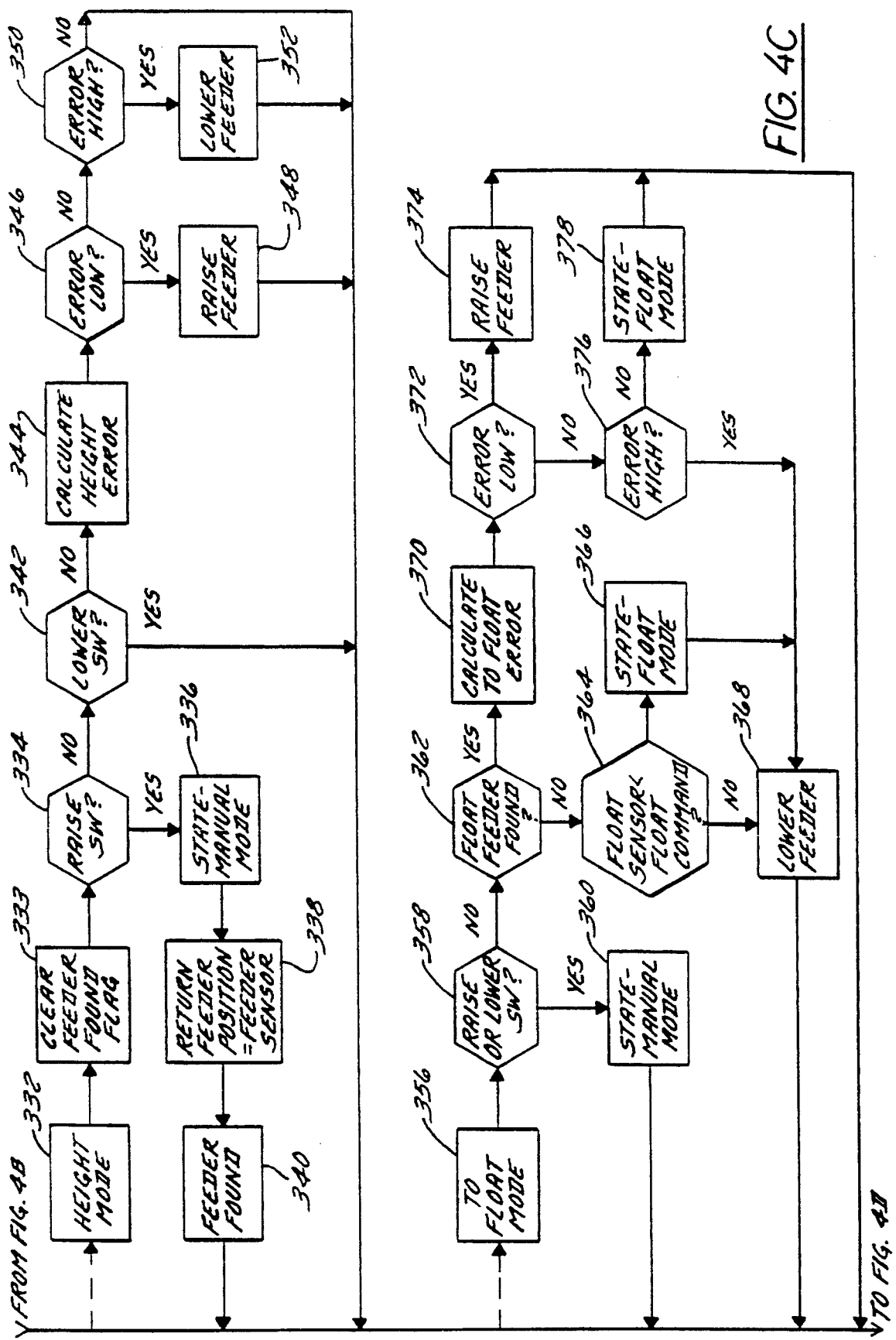
Figure 4D:
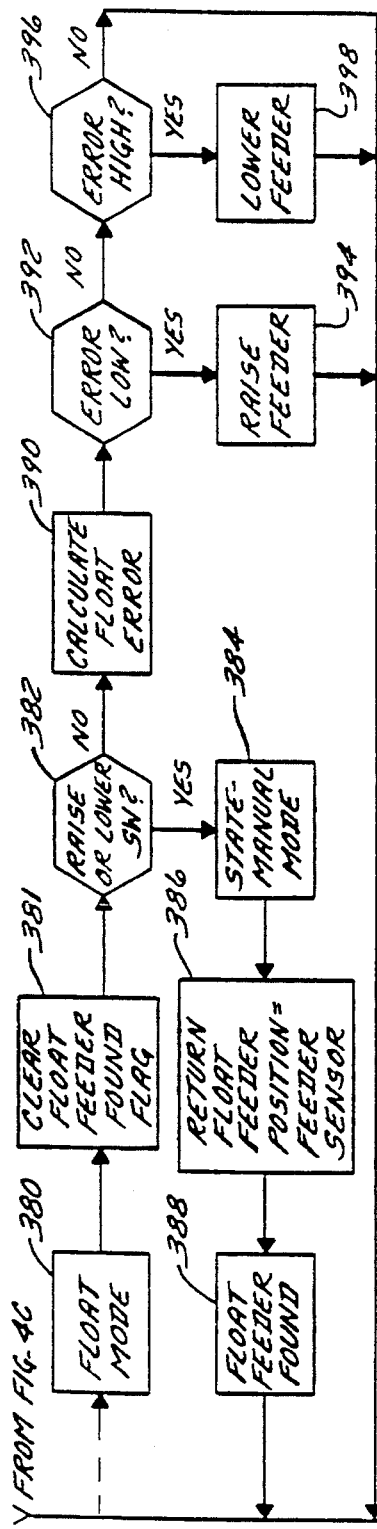
Figure 4D:
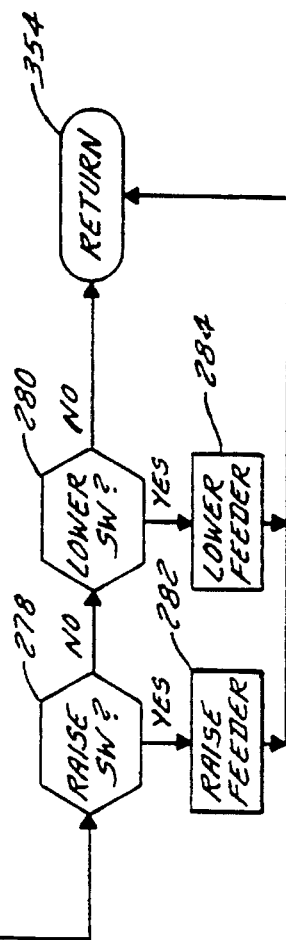

Power for control unit 26 is provided from a conventional 5 V power source 196. By way of example, power source 196 may include a 5 V voltage regulator and appropriate filtering coupled to the battery of vehicle 10. Power from source 196 is provided to processor 86 via filtering circuits 93 and 95. The clocking for processor 86 is provided by capacitors 87 and 89, and crystal 91 coupled together as shown in FIG. 3B.

Serial communications interface 98 (FIG. 3C) is provided to permit communication between control unit 26 and other control systems such as control instrumentation 11 (FIG. 1) of vehicle 10. For example, serial interface 98 is configured to communicate with display 17 display 17 is preferably located on control instrumentation 11. Display 17 includes a display control circuit 220 configured to drive an alphanumeric display 222 such as an LCD display. Interface 98 is configured to provide an implement position signal indicative of the height of header 22 to area counter 15 (FIG. 1). The implement position signal may be directly obtained or derived by control system 24 from position sensor 34.

Interface 98 includes an inverter with hysteresis 223, capacitors 224, 226 and 228, resistors 230, 232, 234 and 236, and serial communication chip 238 (e.g. LT 1485N serial chip) coupled together between the transmit and receive pins of processor 86 and display control circuit 220 as illustrated in FIG. 3. Display control circuit 220 is configured to format data transmitted from processor 86 by interface 98 to circuit 220 so that such data is capable of producing the appropriate characters on display 222 located (e.g. within cab 20, see FIG. 1) for viewing by the combine operator from within cab 20. By way of example, display 222 may have four seven-segment characters and a decimal point between three of the characters and the fourth character. Alternatively, display 222 may also include icons and text segments in addition to the character segments.

In one embodiment of system 24, processor 86 is configured (programmed) to transmit data representative of the position of header 22 as monitored by position sensor 34 to display control circuit 220 via interface 98. In response to this data, circuit 220 controls display 222 to produce a displayed value representative of the positional relationship between header 22 and vehicle 10. Processor 86 is programmed to convert the position signal produced by position sensor 34 to data for controlling display 222 to display the height of header 22 in inches or centimeters.

Processor 86 can also be programmed to transmit data to display control circuit 220 which is representative of the signal produced by transducer 36 which is in turn representative of the location of header 22 relative to the ground surface 23. In response to this data, control circuit 220 controls display 222 to display a numerical value representative of the distance between bottom surface 206 of header 22 and ground surface 23 (e.g. a distance having units of inches or centimeters).

Additionally, processor 86 may also be programmed to transmit data representative of the force (e.g. pounds or neutrons) being exerted by mechanism 40 on header 22 to control circuit 220 via interface 98. In particular, processor 86 monitors transducer 38 and converts the hydraulic pressure into data representative of the float force required to maintain the position of header 22 relative to vehicle 10 or ground surface 23. This data is utilized by control circuit 220 to produce a number representative of the force on display 222. By way of example, the force may be displayed as a percentage of the pressure when header 22 is fully supported by surface 23 or mechanism 40.

Depending upon the application, processor 86 may be programmed to produce display data representative of one or more of the locations of header 22 relative to vehicle 10, the distance of header 22 relative to surface 23, or the force applied to header 22. Where more than one type of data is displayed, the icons and/or text segments can be controlled to inform the operator of the type of data being displayed. System 24 may be calibrated by setting high and low positions of header 22 relative to vehicle 10, high and low locations relative to surface 23, and high and low forces applied by mechanism 40 by moving header 22 between the desired positions and locations, and by applying a range of forces while in a calibration mode. Furthermore, processor 86 may be programmed to permit calibration of a range for the display data.

The interaction of control circuit or unit 26 with valve 32 for controlling the raising and lowering of header 22 is described in detail below in reference to FIG. 4. The programming which configures (programs) processor 86 to provide appropriate control of the position of header 22, also described in reference to FIG. 4, is stored in memory circuit 100. In general, control unit 26 controls the position of header 22 based upon the position (setting) of selector switch 48, the status of switch 58, the digital values produced by analog-to-digital converter 88 representative of the settings of generators 50, 52, 54 and 56, and the analog signals produced by position sensor 34 and transducers 36 and 38.

As discussed above, position sensor 34 and transducer 36 may be potentiometers in the present embodiment. Position sensor 34 is mechanically coupled to a linkage arrangement 200 which rotates the wiper of the potentiometer associated with position sensor 34 to produce a voltage representative of the positional relationship between header 22 and vehicle 10. The potentiometer associated with transducer 36 is mechanically coupled to a location sensor skid 202, located generally at the center of header 22, and to a cable arrangement 204 which moves the wiper of transducer 36 based upon the distance between the bottom 206 of header 22 and the surface 23 upon which skid 202 is resting. This arrangement of transducer 36, skid 202 and cable arrangement 204 produces a voltage representative of the distance between bottom 206 and surface 23. Control system 24 or control instrumentation 11 can more accurately determine the actual height of header 22 from ground surface 23 by adjusting the position signal with data from transducer 36. Alternatively, depending upon the application, another type of proximity sensor such as an ultrasound sensor or optical sensor could be substituted for transducer 36, skid 202 and cable assembly 204 to produce a signal representative of the distance between bottom 206 and surface 23.

In the present embodiment, transducer 38 is a pressure transducer which communicates with the fluid conduit which pressurizes lift cylinder 40 to raise header 22. This arrangement of pressure transducer 38 produces a signal representative of the force being applied to header 22 for example, equal to some minimum value when the full weight of header 22 is not being supported by surface 23.

System 24 can operate in a manual mode, return to cut (RTC) mode, a float mode, and a height mode. In the manual mode, system 24 moves header 22 up and down in response to the operation of switch 58. In the height mode, system 24 maintains header 22 at a selected location relative to surface 23. In the float mode, system 24 maintains header 22 at a selected contact pressure with surface 23. In the RTC mode, system 24 allows the user to raise header 22 from a predetermined position by toggling switch 58 upward (typically at the end of a row in a field) and then automatically return to the position by toggling switch 58 downward (typically at the beginning of a row in the field).

FIG. 4 (4A, 4B, 4C, 4D) illustrates the sequence of steps which processor 86 is programmed (configured) to carry out while operating in one of the manual, RTC, float or height modes. Each time processor 86 completes the sequence of steps specified by FIG. 4, processor 86 clocks the first inputs of AND gates 188 and 190 (FIG. 3), and applies the appropriate pulse-width signal to the other inputs of AND gates 188 and 190. For example, if upon executing all of the instructions associated with the flow chart of FIG. 4, a decision is made to raise header 22, 0 width pulses would be applied to AND gate 190 so that coil driver circuit 186 is inoperative, and pulses of appropriate widths would be applied to AND gate 188 to cause coil driver circuit 184 to open valve 32. In response, valve 32 applies pressurized fluid to lift cylinders 40 to raise header 22.

As discussed in detail below, when header 22 is moved by system 24, the speed of movement is based upon the difference between the selected position and the desired position, the selected height and the actual height, or the selected float pressure and the actual float pressure (e.g., proportional control). Thus, when the difference is large, the error is large, and the width of the pulses applied to the appropriate AND gate 188 or 190 is correspondingly large. As the implement is moved toward the desired position, height location or float position, the error is reduced, the width of the pulses applied to the appropriate AND gate 188 or 190 is reduced to slow the speed at which header 22 is moved, and the speed of header 22 goes to zero when the desired setpoint is reached.

In operation, processor 86 samples the status of selector switch 48 via shift register 97 and circuit 100 to determine the mode of operation for system 24 (step 250, startup). Next, processor 86 determines the digital value associated with signal generators 50 and 52 (step 252). The analog values produced by generators 50 and 52 are applied to analog-to-digital converter 88 via multiplexer 96 and filtering circuit 94. Depending upon the mode selected at switch 48, processor 86 stores the digital value produced by analog-to-digital converter 88 representative of the position of generator 50 as the desired height or position value, and the digital value produced by converter 88 representative of the position of generator 52 as the desired float value.

In step 254, processor 86 controls multiplexer 96 via databus 168 to apply the signals produced by sensor 34, transducer 36, and transducer 38, to converter 88 via multiplexer 96 and isolation circuit 94. Upon applying the respective signals produced by transducers 34, 36 and 38 to converter 88, the digital values produced by converter 88 are stored by processor 86 in the memory of circuit 100.

In step 256, processor 86 determines if momentary switch 58 has been momentarily actuated to the lower most position (e.g. 0.1–0.6 seconds). If such a condition has occurred, soft-lower flag is set. In step 258, processor 86 controls multiplexer 96 via bus 168 to apply the analog signals produced by generators 54 (maximum raise rate signal, e.g. 2–10 seconds for header 22 raising) and generator 56 (maximum lower rate signal, e.g. 2–10 seconds for header 22 lowering) to analog-to-digital converter 88 via filtering circuit 94. Processor 86 stores the digital values produced by converter 88 representative of the maximum raise and lower rates in circuit 100. Based upon the maximum raise and lower rate signals, processor 86 calculates and stores acceleration and deceleration values representative of the accelerations between zero speed of header 22 and the selected raise and lower rates. By appropriately accelerating and decelerating header 22 via control unit 26, relatively smooth motion of header 22 is achieved even though hydraulic accumulators are either eliminated from system 24 or reduced in size.

The raise and lower rate acceleration values are stored as values which progressively increase to the maximum raise/lower rate values, and the raise and lower rate deceleration values are stored as values which progressively decrease from the maximum raise/lower rate values to zero. The acceleration values are used by processor 86 to increase (ramp up) the pulse widths from zero to the maximum associated with the maximum rate during the acceleration period for header 22 (e.g. 0.1–0.5 seconds), and the deceleration values are used by processor 86 to decrease (ramp down) the pulse widths from the maximum to zero during the period of deceleration of header 22 (e.g. 0.1–0.5 seconds).

In step 260, processor 86 reads data stored in memory 100 represented of the state (selected mode) of switch 48 and executes the subroutine associated with the selected mode. In step 262, processor 86 defaults to the manual mode. In step 264, if switch 48 is set to the height mode, if the soft lower flag is set, and if the desired height value as generated by generator 50 is less than the height value sensed at potentiometer 36, processor 86 sets a flag for the "to height mode" subroutine (step 266) and the lower feeder subroutine is called (step 268). The lower feeder subroutine sets the width of the pulses applied to valve 32 for lowering header 22 based upon pressure or position error or a fixed width based upon the setting of generator 56 when in the manual mode.

If switch 48 is not set to the height mode or the desired height value is greater than the height value representative of the signal from transducer 36, processor 86 executes step 270. In step 270, if switch 48 is set to the float mode, if the soft lower flag is set, and if the desired float value produced by generator 52 is less than the sensed float value produced by transducer 38, processor 86 sets a flag for the "to float mode" subroutine (step 272) and the lower feeder subroutine is called (step 268). It should be noted that the sensed float value referred to here corresponds to the pressure in cylinders 40 required to support header 22. Thus, lowering header 22 has the effect of lowering the sensed float value by allowing header 22 to be supported to a greater degree by surface 23. If switch 48 is not set to the float mode, or the desired float value is greater than the value representative of the signal produced by transducer 38, processor 86 executes step 274.

In step 274, processor 86 determines if switch 48 is set to the RTC mode, if the soft lower flag is set, and if the desired position value representative of the signal produced by generator 50 is less than the feeder position value representative of the signal produced by position sensor 34, processor 86 sets the control position subroutine flag (step 276) and the lower feeder subroutine is called (step 268). If any of the conditions in step 274 are not true, processor 86 defaults to the manual mode and samples the status of switch 58 to determine if switch 58 has been toggled to the raise or lower position (steps 278 and 280). If switch 58 is in the raise position, the raise feeder subroutine is called (step 282), and if switch 58 is in the lower position, the lower feeder subroutine is called (step 284). The raise feeder subroutine sets the width of the pulses applied to valve 32 for raising header 22 based upon position error, or a fixed width when in the manual mode.

While system 24 is operating in the return to cut mode, and header 22 is operating in the position selected for cutting, as represented by the signal produced by generator 50, the "control position" subroutine is executed by processor 86. In step 286, processor 86 begins executing the "control position" subroutine. In step 288, switch 58 is sampled to determine whether or not the operator is attempting to manually control the location of header 22. If switch 58 has been operated, processor 86 goes into the manual mode and executes a combination of steps 278, 280, 282 and 284 (step 290). If switch 58 was not operated, processor 86 calculates the difference between the desired position value and the position value representative of the signal generated by position sensor 34 to produce a position error value (step 292). If the position error indicates that header 22 is too low (step 294), the raise feeder subroutine is called (step 296). If processor 86 determines that header 22 is not too low (error high), processor 86 compares the desired float sensor value to the float sensor value representative of the signal produced by pressure transducer 38 (step 298). If processor 86 determines that the float error represents a float pressure lower than the desired pressure (steps 300 and 302, again referring to the pressure or force by surface 23 tending to raise header 22, i.e. a surface 23 support force greater than the desired support force), the raise feeder subroutine is called (step 296). If processor 86 calculates a float error which represents that the float pressure is higher than the desired float pressure (step 304), the lower feeder subroutine is called (step 306). Upon completion of the control position routine, switch 58 is again sampled by processor 86 (steps 278 and 280) and the raise and lower feeders subroutines are appropriately called (steps 282 and 284). (Steps 298, 300, 302, 304 and 306 provide float control override of position control.)

The "to height mode" subroutine (step 308) is entered when the height mode has been set in step 266 as discussed above. In the "to height mode" subroutine, switch 58 is sampled (step 310) and if the raised position of switch 58 has been toggled, processor 86 goes into the manual mode and executes a combination of steps 278-284 (step 312). In step 314, processor 86 determines whether or not a setting is present in memory 100 representative of the position of header 22 associated with a particular height setpoint value (i.e. feeder found flag is set) as determined in step 252. Upon startup of vehicle 10, a position value associated with the desired height value will not be present in memory 100. When a position value is not available (i.e. the feeder found flag is not set), processor 86 determines the difference between the desired height value representative of the position of generator 50 and the actual height value representative of the value produced by transducer 36 (step 316).

In step 314, when a position value associated with the height value is not available, a flag is set by processor 86 to reduce the size of the pulse widths applied to AND gates 188 or 190. This is done so that header 22 is moved relatively slowly while being moved toward the desired height. This prevents jerking of header 22 since skid 202, linkage 204 and transducer 36 do not begin producing a meaningful signal until skid 202 comes in contact with the ground. In step 316, if the height value representative of the signal at transducer 36 is greater than the desired height value representative of the signal produced by generator 50, the lower feeder subroutine is called (step 322). When the sensed height value is less than the desired height value, the height mode flag is set (step 318).

If processor 86 determines that a position value associated with the desired height value is stored in memory 100, processor 86 calculates the error between the position value representative of the signal produced by position sensor 34 and the position value associated with the desired height (step 324). In step 326, the processor calls the raise feeder subroutine (step 320) if the error represents the location of header 22 which is too low for the associated height, and in step 328, if the error is high, calls the lower feeder subroutine (step 322). If the error is neither high nor low, processor 86 sets the height mode flag (step 330). In general, while running the "to height subroutine," processor 86 controls the operation of lift cylinders 40 using position sensor 34 (i.e. position control) until header 22 is at a position within a range defined by high and low error bands (e.g. within ±1.5% to 2% of the desired position) at which time processor 86 enters the height mode subroutine (step 332) to begin controlling the location of header 22 relative to surface 23 based upon the signal generated by transducer 36 (i.e. height or location control).

The "height mode" (step 332) subroutine is entered in response to processor 86 setting a height mode flag in steps 318 or 330. In step 333 the feeder found flag is cleared. In step 334, processor 86 determines whether or not switch 58 has been toggled to the raise position. If switch 58 has been toggled to the raise position, then processor 86 goes into the manual mode (step 336) and sets the feeder position value associated with the desired height stored in memory 100 to the position value representative of the signal produced by position sensor 34 (step 338). In step 340, processor 86 sets a feeder found flag which is tested by processor 86 in step 314 to determine whether or not a position value representative of the desired height is stored in memory 100. In step 334 if switch 58 has not been toggled to the raise position, processor 86 determines if switch 58 has been toggled to the lower position (step 342). If switch 58 has been toggled to the lower position, the lower feeder subroutine is called in step 284. If switch 58 has not been toggled to the lower position, processor 86 samples the height value representative of the signal produced by potentiometer 36, compares this actual height value to the desired height value representative of the signal produced by generator 50, and calculates a height error value (step 344). If the error value indicates that header 22 is too low, the raise feeder subroutine is called (step 346 and 348), if the error signal indicates that header 22 is too high, the lower feeder subroutine is called (steps 350 and 352). If the error calculated is between the low error value (step 346) and the high error value (step 350), processor 86 does not call either the raise or lower feeder subroutines. After steps 340, 342, 348 or 352 have been executed, processor 86 samples the status of switch 58 at steps 278 and 280, and returns to the start of the program (step 254).

The "to float mode" subroutine (step 356) is entered in response to the setting of the "to float mode" flag at step 272 discussed above. In the "to float mode," switch 58 is sampled (step 358) and if the raised position of switch 58 has been toggled, processor 86 goes into the manual mode and executes a combination of steps 278–284 (step 360). In step 362, processor 86 determines whether or not a setting is present in memory 100 representative of the position of header 22 associated with a particular float setpoint value (i.e. checks the float feeder found flag. (Upon start-up of vehicle 10, a position value associated with the desired float value will not be present in memory 100.) Where a position value is not available, processor 86 determines the difference between the desired float value representative of the position of generator 52 and the actual float value representative of the signal produced by pressure transducer 38 (step 364).

In step 362, when a position value associated with the float value is not found (i.e. float feeder found flag set), a flag is set by processor 86 to reduce the size of the pulse widths applied to AND gates 188 or 190 during the execution of the lower feeder flag subroutine. This is done so that header 22 is moved relatively slowly while being moved toward the desired float pressure. This reduces jerking of header 22 since the float value representative of the signal produced by transducer 38 changes abruptly when bottom 206 of header 22 comes in contact with the ground. If the sensed float value is greater than the desired float value, the lower feeder subroutine is called (step 368). In step 364, if the float value representative of the signal at transducer 38 ("sensed float value") is less than the desired float value representative of the signal produced by generator 52, the float mode flag is set (step 366).

If processor 86 determines that a position value associated with the desired float value is stored in memory 100 (i.e. float feeder found flag set), processor 86 calculates the error between the position value representative of the signal produced by position sensor 34 and the position value associated with the desired float value (step 370). In step 372, processor 86 calls the raise feeder subroutine (step 374) if the error represents the location of header 22 which is too low for the associated float value. In step 376, if the error is high, the processor 86 goes to step 368 to call the lower feeder subroutine. If the error is between the high and low limit values, processor 86 sets the float mode flag (step 378).

In general, while running the "to float mode" subroutine, processor 86 controls the operation of lift cylinders 40 using position sensor 34 until header 22 is at a position within a range defined by the high and low error values associated with the selected float pressure. Subsequently, processor 86 can enter the "float mode" subroutine to begin controlling the location of header 22 relative to surface 23 based upon the signal generated by transducer 38 (float control).

The "float mode" (step 380) subroutine is entered in response to processor 86 setting a float mode flag in steps 366 or 378. In step 381 the float feeder found flag is cleared. In step 382, processor 86 determines whether or not switch 58 has been toggled to the raise or lower position. If switch 58 has been toggled to the raise or lower position, then processor 86 goes into the manual mode (step 384) and sets the feeder position value associated with the desired float to the position value representative of the signal produced by position sensor 34 (step 386). Processor 86 then sets a float feeder found flag (step 388) which is tested by processor 86 in subsequent loops through the program at step 362 to determine whether or not a position value associated with the desired float value is stored in memory 100.

If switch 58 has not been toggled, processor 86 samples the float value representative of the signal produced by transducer 38, compares the float value to the desired float value representative of the signal produced by generator 52, and calculates a float error value (step 390). If the error value indicates that header 22 is too low (i.e. that the pressure currently exerted to support header 22 is too low), the raise feeder subroutine is called (steps 392 and 394), if the error signal indicates that header 22 is too high (i.e. that cylinders 40 are currently supporting header 22 to an extent greater than desired), the lower feeder subroutine is called (steps 396 and 398). If the error calculated is between a low error value (step 392) and a high error value (step 396), processor 86 does not call either the raise or lower feeder subroutine. After processor 86 samples the status of switch 58 at steps 278 and 280, processor 86 returns to the start of the program (step 254).

Upon reaching step 354 (FIG. 4D), processor 86 will have calculated a pulse width, and stored the values of the pulse width in memory 100. The maximum width of the pulse width value for raising and lowering header 22 via the control of lifting cylinders 40 by control valve 32 is determined by processor 86 from the digital values representative of the settings of generators 54 and 56, respectively. Based upon the range of pulse width values available for controlling the speed of raising and lowering and the error signal, processor 86 calculates the raise or lower pulse width values when the raise and lower feeder subroutines (steps 282 and 284) are called. Thus, for a very high error signal values, processor 86 will use the maximum pulse width values, and for an error signal value approaching zero, processor 86 will use a relatively short duration pulse width values.

Each time processor 86 goes through the control sequence represented in FIG. 4 and reaches step 354, the pulse width modulated signal having a width calculated when the raise or lower subroutine is called, is applied to the appropriate AND gate 188 or 190 depending upon whether or not header 22 is to be raised or lowered. If header 22 is to be raised, AND gate 188 is pulsed by processor 86 to drive coil driver 184 which pulses valve solenoid 80 of valve assembly 32 to pressure lift cylinders 40 and thereby raise header 22. If header 22 is to be lowered, processor 86 applies a pulse width modulated signal to AND gate 190 which applies the pulse width signal to coil driver circuit 186 which pulses valve solenoid 82 of valve assembly 32 to allow hydraulic fluid to flow from lit cylinders 40 and thereby lower header 22. Subsequent to pulsing the appropriate gate 188 or 190, processor 86 goes back to step 250 and executes the control sequence represented in FIG. 4.

Figure 5:
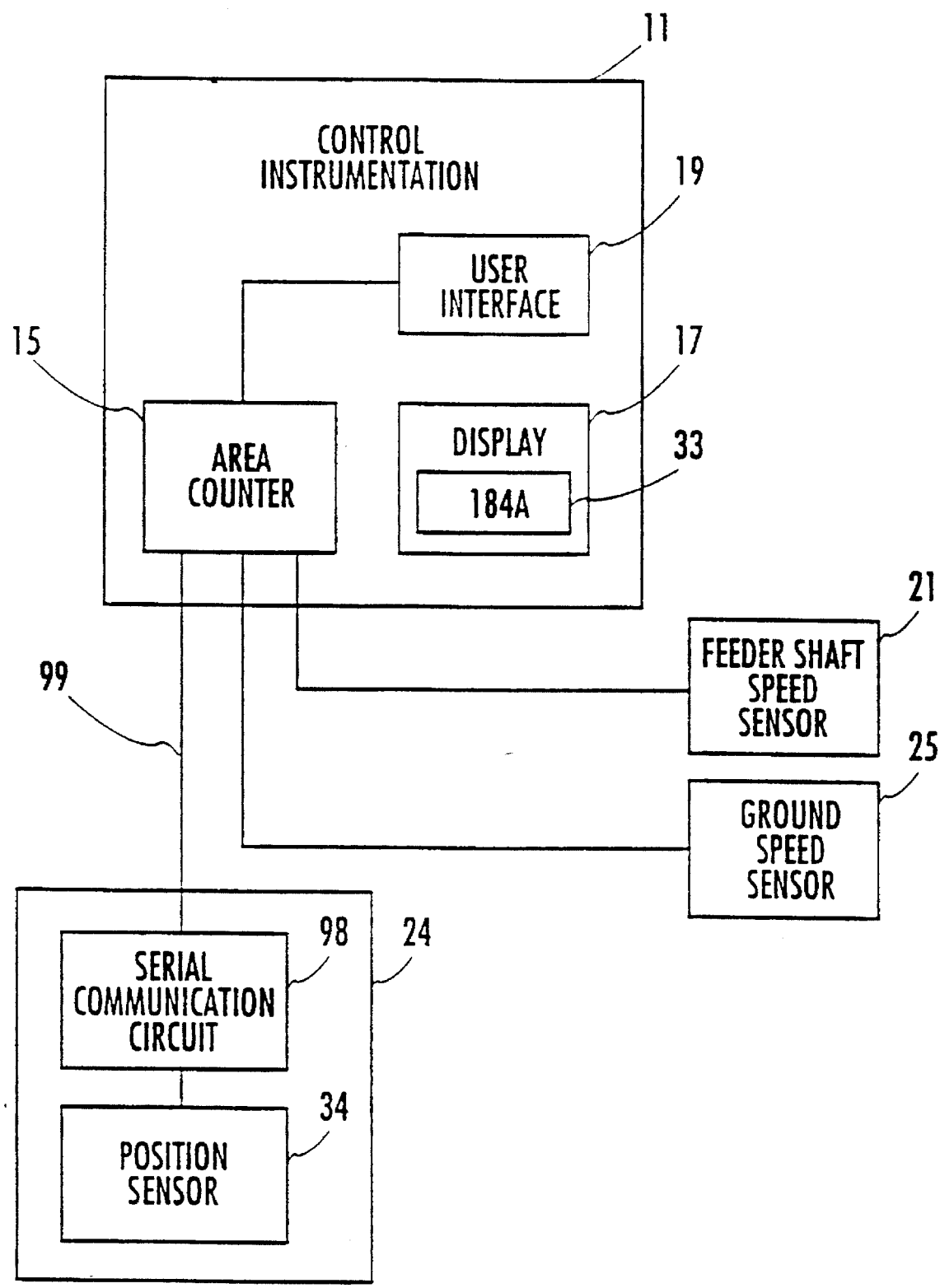
FIG. 5 is a schematic block diagram of an area counter for the agricultural vehicle illustrated in FIG. 1 in accordance with the preferred exemplary embodiment of the present invention.

With reference to FIG. 5, control instrumentation 11 includes a user interface 19, area counter 15, and display 17. Area counter 15 is coupled to user interface 19 and display 17. Display 17 includes an area counter display 33 for providing numeric indicia of the area upon which header 22 has operated (e.g., the characters 184A). Area counter display 33 is preferably separate from display 222 (FIG. 3). Area counter 15 and control instrumentation 11 are also coupled to feeder shaft speed sensor 25, ground speed sensor 21, and serial communication circuit 98 of control system 24.

Serial communication circuit 98 is preferably coupled to position sensor 34 and serially provides a position signal (e.g., the implement position signal discussed with reference to FIGS. 3–4) representative of the elevation of header 22 with respect to the earth or ground surface 23 or with respect to vehicle 10. The position signal is provided across a serial communication link 99 such as an RS485 link between instrumentation 11 and system 24. The position signal is preferably a serial digital signal representative of the actual height of header 22 from a maximum level to a minimum level. Thus, area counter 15 receives the position signal representative of the particular elevation of header 22.

Feeder shaft speed sensor 21 provides a feeder speed signal indicative of the speed of the axle which drives the conveyor mechanism in feeder 29. Feeder shaft speed sensor 21 is preferably located proximate gear teeth in feeder 29 so that sensor 21 can magnetically sense the speed of the conveyor mechanism. Feeder shaft speed sensor 21 is a reluctance sensor which provides the feeder shaft speed signal as an analog sine wave signal having a frequency proportional to the speed of the conveyor in the feeder 29. The feeder shaft speed signal advantageously provide an indication of weather feeder 29 is operating (e.g., whether a crop is being harvested by vehicle 10).

Control instrumentation 11 includes a microprocessor (not shown) such as a 68HC11 microcontroller manufactured by Motorola and a memory device (not shown) such as an EEPROM for storing data. Feeder shaft speed sensor 25 is coupled to an interrupt input on the microprocessor. The microprocessor is advantageously programmed with an interrupt subroutine which tracks the number of peaks provided to area counter 15 by feeder shaft speed sensor 21. The positive peaks of the feeder shaft speed signal interrupt the microprocessor and cause the microprocessor to begin the interrupt subroutine. The interrupt subroutine causes the microprocessor to calculate the speed at which feeder 29 is operating.

Ground speed sensor 25 is preferably a reluctance sensor located proximate axle gear teeth on vehicle 10. Ground speed sensor 25 magnetically senses the speed of a non-driving tire such as wheel 14 of vehicle 10 by sensing the speed of rotation of the gears on the axle of wheel 14. Alternatively, sonic, radar, radio wave, or optical sensors may be utilized to determine the ground speed of vehicle 10.

The ground speed signal is an analog sine wave signal (having a frequency proportional to the speed of vehicle 10) provided by ground speed sensor 25 to a pulse accumulator in area counter 15. The microprocessor preferably includes an integrated pulse accumulator which counts the number of sine wave pulses or peaks of the ground speed signal from ground speed sensor 25. Area counter 15 is programmed to calculate the distance traveled by vehicle 10 based upon the diameter and the number of pulses in the pulse accumulator.

The operator of vehicle 10 is able to input various information into area counter 15 through a user interface 19. User interface 19 may be utilized to provide information to area counter 15 such as the width of header 22, the tire diameter of wheel 14, and the height at which feeder 29 is engaged or disengaged. Such user input information is useful for determining the total area upon which header 22 has operated.

Generally, area counter 15 internally accumulates a total area signal transmitted within counter 15 as total area data indicative of the total area upon which header 22 has harvested. Area counter 15 generates the total area data by accumulating area signals or data every 0.5 seconds as vehicle 10 travels across the field. The area data is representative of the amount of area upon which header 22 has harvested over the last 0.5 seconds.

When generating the area data and accumulating the total area data, area counter 15 determines whether header 22 is actually working on the crop. To determine whether header 22 is actually harvesting, area counter 15 determines whether the feeder shaft speed signal indicates that feeder 29 is operating, whether the ground speed signal indicates that vehicle 10 is moving forward, and whether the feeder position signal provided across serial communication link 99 indicates that header 22 is in an engaged (e.g., harvesting) position. Preferably, when the feeder shaft speed signal indicates that the speed of feeder 29 is greater than 100 rpm, area counter 15 considers feeder 29 to be operating. The position signal indicates that header 22 is engaged when the position signal is below a threshold level; the operator may set the threshold level by manipulating user interface 15.

When header 22 is harvesting (e.g., reel 35 manipulating the crop) or otherwise working on the field, area counter 15 calculates the area data in accordance with the width of header 22 and the ground speed signal. The area data is accumulated every ½ second and added to the total area data which is stored in the EEPROM. Area counter 15 provides the total area data to display 17. Display 17 preferably provides a numerical indication of the total area upon which vehicle 10 and header 22 have operated. Area counter 15 may be programmed to display the total area in hectares, acres, square feet, or other units.

Figures 6A, 6B:
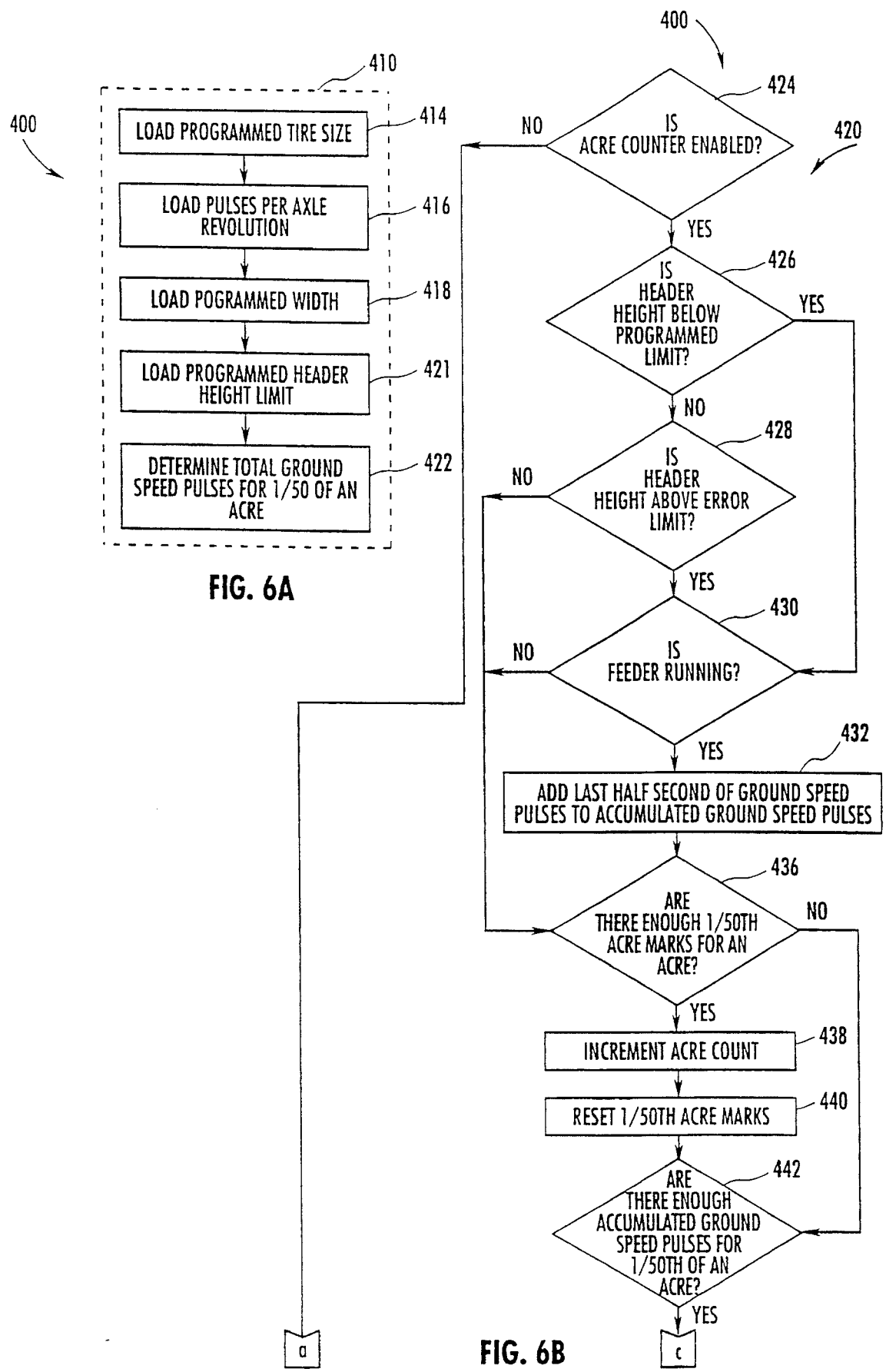
FIG. 6, including sheets 6A, 6B, 6C and 6D, is a flow chart showing a subroutine utilized by the area counter illustrated in FIG. 5.
Figure 6C:
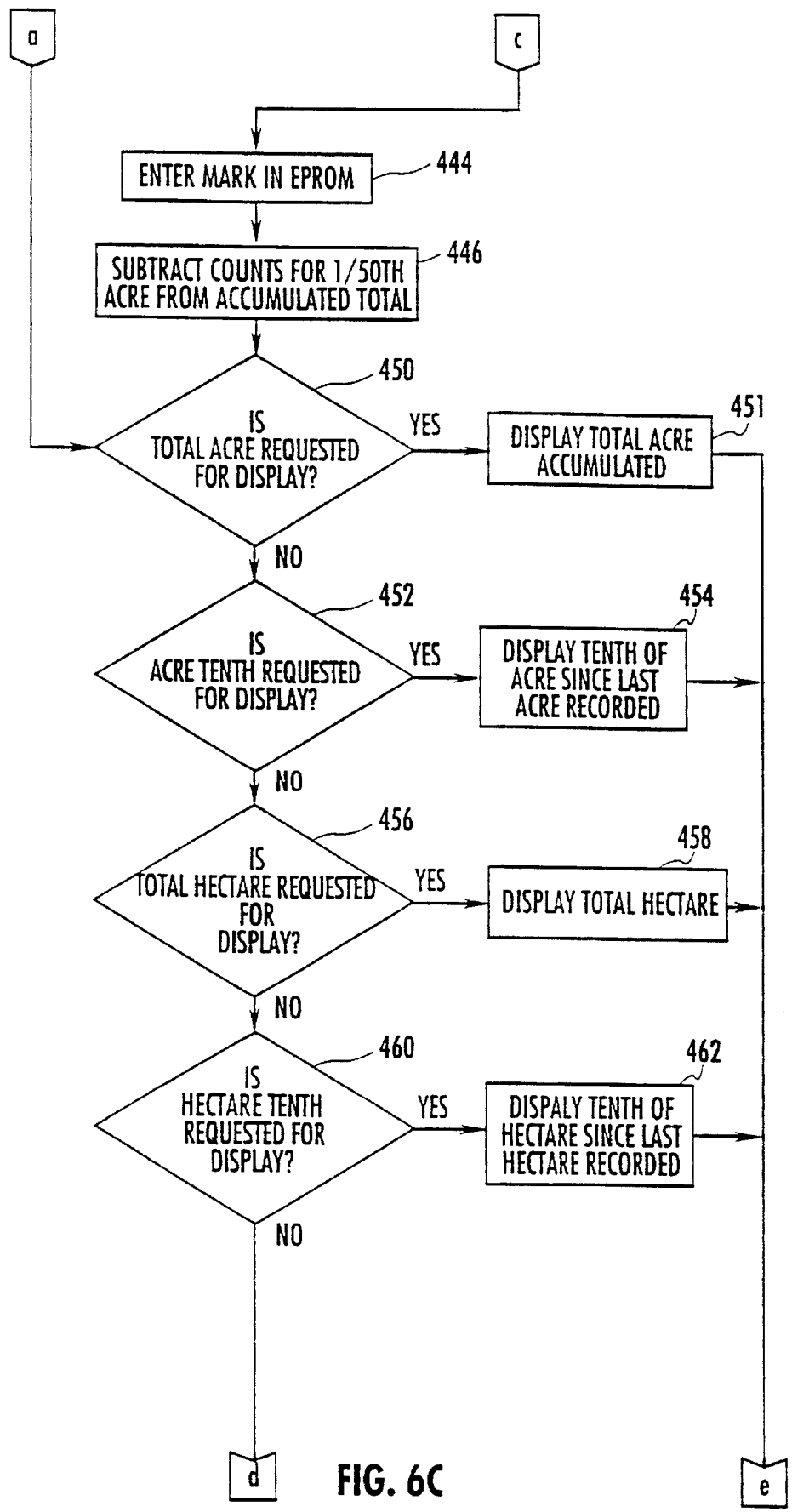
Figure 6D:
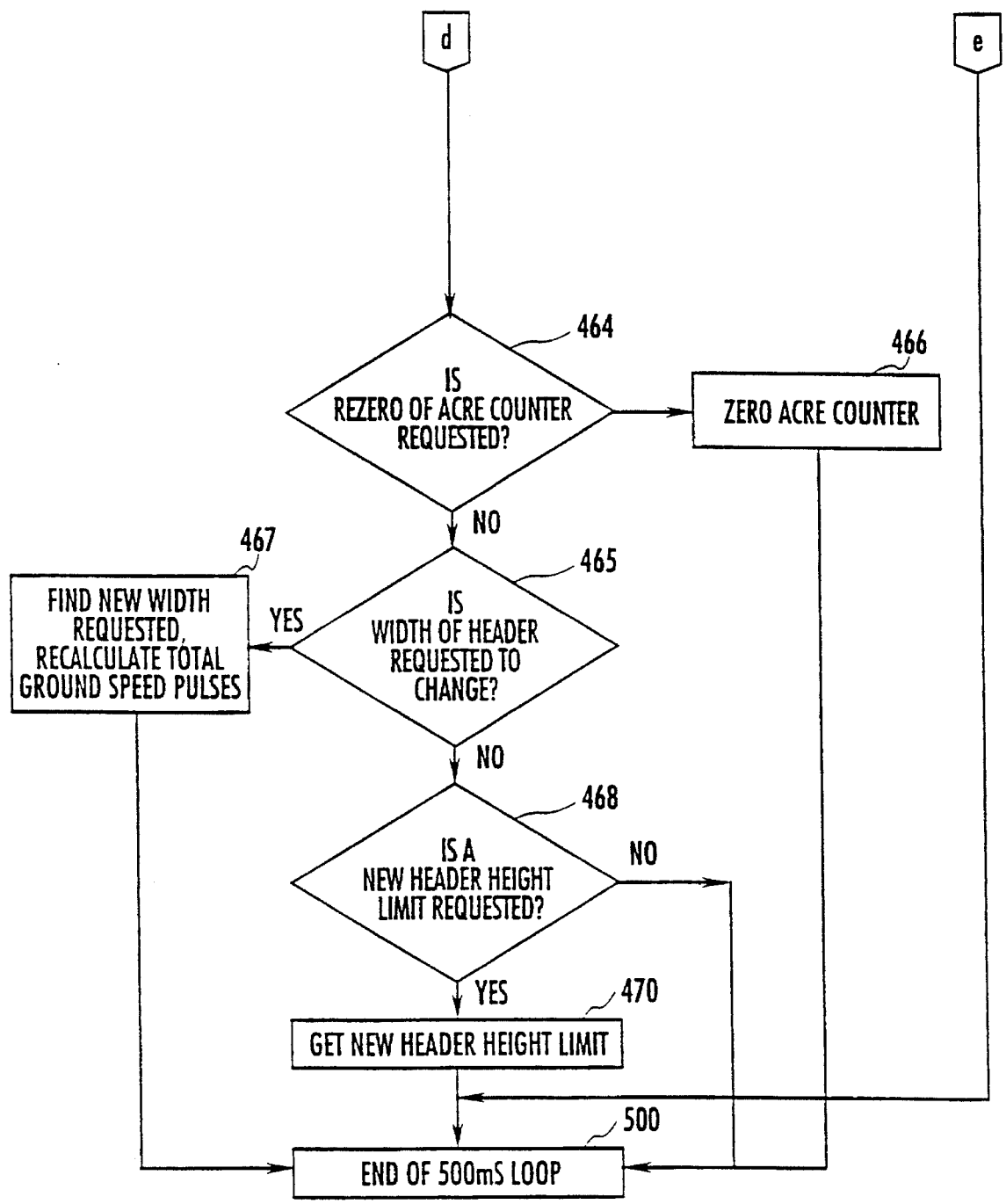

FIG. 6 (FIGS. 6A–6D) shows a subroutine 400 for calculating and accumulating the area of land (field) upon which header 22 has worked. Subroutine 400 is implemented as part of other control algorithms operated by control instrumentation 11. Subroutine 400 may be programmed in a known computer language such as assembly code and loaded into the microprocessor within control instrumentation 11. Subroutine 400 includes an initialization subroutine 410 (FIG. 6A) and an area accumulation subroutine loop 420 (FIGS. 6B–6D). Preferably, control instrumentation 11 performs the steps in loop 420 every 500 milliseconds. With reference to FIGS. 5 and 6 (FIGS. 6A–6D), the operation of area counter 15 is described as follows.

The operator of vehicle 10 provides particular initialization data during initialization subroutine 410 (FIG. 6A) to enable loop 420 to appropriately calculate the area (e.g., accumulate the total area data). Subroutine 410 is implemented whenever the user enters a program mode and initializes values for subroutine 400 by manipulating user interface 19. At a step 414, the user may program the rolling radius of wheel 14 of vehicle 10. The rolling radius may be provided in a manual, measured by the user, or automatically calculated by area counter 15. At a step 418, the user may program the width of header 22.

At a step 421, the threshold level or maximum height at which header 22 is engaged may be programmed by the operator. The threshold level can be adjusted for particular crops. For example, the operator may observe the level at which header 22 harvests the crop by observing the implement position signal on display 222 and use that level to calculate the threshold level. The values programmed by the operator may also be automatically generated by area counter 15 or internally programmed within instrumentation 11. Area counter 15 also provides values for the number of pulses from ground speed sensor 25 per revolution of the axle associated with wheel 14.

Area counter 15 also provides values representative of a feeder height error threshold. The feeder height error threshold is representative of an upper boundary for the position signal. If the position signal is above the feeder height error threshold, the position signal is assumed to be in error. Also, an error limit for the feeder shaft speed signal is also provided by area counter 15.

At a step 422, area counter 15 determines the total number of pulses from ground speed sensor 25 required for header 22 to operate on 1/50 of an acre. The total number of pulses are determined according to Equation (1) as follows:

$$\text{Pulses sensed} = \frac{1664}{2\pi R} \cdot \text{pulses per axle revolution} \cdot W \qquad (1)$$

where:

$2\pi R$ is the rolling circumference of wheel 14 measured in inches, R is the rolling radius programmed in step 414;

pulses per axle revolution is a preprogrammed value provided by area counter 15;

W is the width of header 22 measured in feet and is programmed in step 418; and pulses sensed are the number of pulses required for 1/50 of an acre to be traveled over by header 22. The total number of pulses sensed is utilized in loop 420 to accurately accumulate the total area data.

Area counter 15 accumulates the total area data according to loop 420. At a step 424 (FIG. 6B), area counter 15 determines if the operator desires the area to be accumulated (area counter 15 is enabled). If area counter 15 is not enabled, area counter 15 advances to a step 450 discussed below. If area counter 15 is enabled, area counter 15 determines if the position signal indicates that header 22 is below the programmed threshold value (the header height limit in step 421). If the position signal is below the programmed threshold level (header 22 is engaged), area counter 15 advances to a step 430.

If the position signal is above the threshold level (header 22 is not engaged), area counter 15 advances to a step 428 and determines if the position signal is above the error limit. If the position signal is below the error limit, area counter 15 advances to a step 436 discussed below. If the position signal is above the error signal at step 428, area counter 15 disregards the position signal, assumes that header 22 is in engaged position, and advances to step 430. Area counter 15 or control instrumentation 11 may also provide a warning or other indicia on display 17 that position sensor 34 is not operating properly.

At step 430, area counter 15 determines if the conveyor mechanism in header 22 is running by comparing the speed of the conveyor mechanism derived from feeder shaft speed signal to a threshold limit. If the speed is greater than the threshold limit, the conveyor mechanism in header 22 is operating and area counter 15 advances to a step 432. The threshold limit is representative of 100 rpm. If the speed is below the threshold limit, area counter 15 advances to step 436.

Preferably, the feeder shaft speed signal is provided at the interrupt input of the microprocessor and sampled every 100 milliseconds. The feeder shaft speed signal interrupts the microprocessor, thereby initiating an interrupt subroutine which determines the amount of time between interrupts. The microprocessor is programmed to calculate the rate or speed at which the conveyor mechanism in feeder 29 is operating in response to the time between interrupts.

At a step 432, (after the speed of feeder 29 and height of header 22 have been checked), area counter 15 adds the ground speed pulses (e.g., the area data or signal) from the pulse accumulator of the microprocessor to the total number of ground speed pulses (e.g., the total area data). The pulse accumulator is cleared or rest to 200 during step 432. The total number of ground speed pulses are stored in memory, preferably RAM.

At step 436, the number of accumulated 1/50 of an acre marks are compared to the threshold of 50 acre marks required for an acre. If there are less than 50 accumulated 1/50 of an acre marks, area counter 15 advances to a step 442. If there are at least 50 1/50 acre marks, area counter 15 increments the acre count at a step 438 and resets the number of accumulated 1/50 of an acre marks (preferably to zero).

The 1/50 of an acre marks are advantageously stored in 50 bit locations in the EEPROM associated with the microprocessor. The 1/50 of an acre marks (bit marks) each represent 1/50 of an acre and are provided at different address locations. By utilizing this advantageous scheme, the unnecessary writing and rewriting of bits on the EEPROM is reduced.

At step 442, the total number of ground speed pulses are checked against the number of pulses required for 1/50 of an acre (from Equation 1). If there are enough total ground speed pulses, a 1/50 acre mark is programmed in the EEPROM at a step 444 (FIG. 6C) and the number of ground speed pulses required for 1/50 of an acre are subtracted from the total number of ground speed pulses at a step 446.

At a step 450, area counter 15 determines if the operator has requested that the total number of acres be displayed on display 17. The user may request the display of the total number of acres by manipulating keys or buttons on user interface 19. If the user has requested that the total number of acres be displayed, area counter 15 provides the acre count to display 17 and display 17 displays the total area in acreage upon which header 22 has operated at a step 451. After step 462, area counter 15 advances to a step 500 and loop 420 is ended.

If the user has not requested that the total number of acres be displayed, area counter 15 determines if the user has requested that the latest number of acres in tenths be displayed at a step 452. If the user has made such a request, area counter 15 provides a 1/10 acre signal to display 17 so that display 17 provides tenths of the area signal at a step 454 and advances to step 500. The 1/10 acre signal is derived from the 1/50 of an acre marks stored in the EEPROM.

If the user has not made such a request, area counter 15 advances to a step 456 and determines if the user has requested the total number of hectares to be displayed at a step 456. If so, area counter 15 provides signals to display 17 so that display 17 displays the total number of hectares upon which header 22 has worked at a step 458, and then advances to step 500. The microprocessor calculates the number of hectares as a conversion of the acre count. If the operator has not made such a request, area counter 15 advances to a step 460 and determines if the user has requested that the hectares in tenths be displayed. If so, area counter 15 provides signals to display 17 so that display 17 displays the tenths of hectares at a step 462 and advances to step 500. The microprocessor calculates the tenths of hectares as a conversion of the acre count and the 1/50 of an acre marks stored in the EEPROM.

If the request to display hectares in tenths was not made, area counter 15 advances to a step 464 and determines whether the operator has requested that area counter 15 be reset or rezeroed. If so, area counter 15 resets the area signals and total area data to zero (e.g., the ground speed pulses to zero, the total ground speed pulses to zero, the 1/50 acre marks to zero, and the acre count to zero) at a step 466 and then advances to step 500.

If the operator has not requested that area counter 15 be reset, area counter 15 advances to a step 465 and determines if the operator has requested that the width value for header 22 be changed. If so, area counter 15 advances to a step 467, determines the new header width, calculates the number of pulses required for 1/50 of an acre with the new header width in accordance with Equation 1, and then advances to step 500. If the width was not changed, area counter 15 determines if a new height limit (a new threshold level) has been entered at a step 468. If so, area counter 15 determines the new header height limit at a step 470, and advances to step 500. If not, area counter 15 advances to step 500.

Loop 420 is re-engaged every 1/2 second as part of the control algorithm for vehicle 10 and the area is accumulated or tracked as vehicle 10 operates on a field. The EEPROM retains the data associated with the thresholds, ground speed pulses, 1/50 acre marks, acres, and hectares when vehicle 10 is turned off or power is not provided to area counter 15.

It will be understood that the description above is of the preferred exemplary embodiment of the invention and that the invention is not limited to the specific forms shown and described. For example, the control system is disclosed in reference to a grain harvesting device; however, the system may also be utilized with other harvesting devices such as cotton pickers. Furthermore, depending upon the application, the various communication links which are hardwired for data and signal communication could be replaced with appropriate wireless communication hardware. Another modification to the system includes providing a transducer 36 and skid arrangement 202 at both ends of header 22 and coupling the second potentiometer to an eight input multiplexer 96. Using this arrangement, processor 86 can be programmed to monitor both sensor 34 and transducer 36 and use the signals from both to control the location of header 22. For example, processor 86 may be programmed to generate a height value for header 22 relative to surface 23 by (1) averaging the signals from sensor 34 and transducer 36, (2) using the greatest value, or (3) using the lowest value. Since header 22 can typically be over 30 feet long, and surfaces 26 can be relatively uneven over such a width, header 22 location control can be improved by using more than one location sensor such as discussed above. The area counter may also be implemented as a hardware logic device rather than a software subroutine.

Other substitutions, modifications, changes and omissions may be made in the design and arrangement of the preferred embodiment without departing from the spirit of the invention as expressed in the appended claims.

We claim:

1. An area monitoring system for use with an agricultural vehicle, the vehicle cooperating with an implement to operate on land, the implement being positionable relative to the vehicle and the land, the system comprising:

an implement position sensor mechanically coupled to the implement to produce a vertical position signal representative of the vertical implement position; and a monitoring circuit including a memory configured to store threshold data representative of a threshold position, the threshold position being a vertical reference position indicative of the implement being engaged to operate on the land, wherein the monitoring circuit communicates with the implement position sensor to compare the vertical position signal to the threshold position and generate total area data representative of a total area of the land operated on by the vehicle, the monitoring circuit calculating the total area signal as a function of a width of the implement, a ground speed signal indicative of a ground speed of the vehicle, and the vertical implement position signal being in a predetermined relationship width the threshold data.

2. The system of claim 1 further comprising a user interface communicating with the monitoring circuit to provide the threshold data to the monitoring circuit for storage in the memory.

3. The system of claim 2 wherein the implement has a width and the user interface further provides a width signal indicative of the width to the monitoring circuit, and the monitoring circuit generates the total area data based upon the width.

4. The system of claim 1 further comprising an implement speed sensor communicating with the monitoring circuit, the implement speed sensor generating an implement speed signal indicative of the speed of the implement, wherein the monitoring circuit accumulates total area data representative of the area of land over which the implement has been operated when the implement speed signal is in a predetermined relationship with an implement speed threshold.

5. The system of claim 1 further comprising a ground speed sensor communicating with the monitoring circuit, the ground speed sensor providing the ground speed signal indicative of the ground speed of the vehicle.

6. The system of claim 1 further comprising a serial communication link coupled to an implement control module and the monitoring circuit, the implement control module being coupled to the implement position sensor and providing the implement position signal across the serial communication link.

7. An agricultural machine for working areas of a field, the machine comprising:

a vertical position sensor configured to sense a vertical position of the machine and generate a vertical position signal representative of the vertical position of the machine;

a display configured to provide visual indicia of an area of the field worked by the machine in response to an area signal; and a control circuit coupled to the vertical position sensor to monitor the position signal and apply the area signal to the display, the control circuit generating the area signal as a function of a ground speed signal and the vertical position signal being in a predetermined relationship with a threshold, the threshold representing the vertical position of the machine at which the machine works on the field.

8. The agricultural machine of claim 7 further comprising a user interface coupled to the control circuit, the user interface providing the threshold to the control circuit.

9. The agricultural machine of claim 7 wherein the agricultural machine is a combine having a header of a particular width, wherein the area signal is related to the particular width.

10. The agricultural machine of claim 9 further comprising:

a feeder shaft located within the header; and a feeder shaft speed sensor coupled to the control circuit and configured to generate a shaft speed signal indicative of the speed of the feeder shaft, wherein the area signal is formulated in accordance with the feeder shaft speed signal being in a predetermined relationship with a second threshold.

11. The agricultural machine of claim 10 further comprising a ground speed sensor coupled to the control circuit, the ground speed sensor providing the ground speed signal indicative of the ground speed of the agricultural machine, and wherein the area signal is formulated in accordance with the ground speed signal.

12. The agricultural machine of claim 9 further comprising a user interface coupled to the control circuit, the user interface providing the threshold.

13. The agricultural machine of claim 12 wherein the user interface further provides a width signal indicative of the width of the header, and the area signal is formulated in accordance with the width signal.

14. The agricultural machine of claim 11 further comprising:

a user interface coupled to the control circuit, the user interface providing the threshold representing the vertical position, wherein the user interface further provides a width signal indicative of the width of the header; and wherein the area signal is formulated by accumulating interval area signals when the position signal is in the predetermined relationship with the threshold and the feeder shaft speed signal is in the second predetermined relationship with the second threshold.

15. The agricultural machine of claim 14 wherein the interval signals are equal to the product of the ground speed signal, the width, and a time interval.

16. An improved combine having a header proximate a header position sensor and a ground speed sensor, the ground speed sensor generating a ground speed signal, the combine performing an agricultural function on an area, the improvement comprising:

an area counter communicating with the header position sensor, and the ground speed sensor, the area counter displaying a total area value indicative of the area, the area counter generating area interval values in accordance with the ground speed signal when the header position sensor indicates that header is positioned below a particular level, the area counter accumulating the area interval values to generate the total area value.

17. The improvement of claim 16 further comprising a user interface for setting the particular level.

18. The improvement of claim 17 wherein the user interface allows a user to input a width factor corresponding to the width of the header.

19. The improvement of claim 18 wherein the area counter is a software subroutine.

20. The improvement of claim 16 wherein the header position sensor provides an analog signal.

* * * * *